July 26, 1966   A. G. TUCCI   3,262,409
FABRIC-SHAPING DEVICES
Filed June 25, 1962   8 Sheets-Sheet 1

INVENTOR
Anthony G. Tucci
BY
ATTORNEY

July 26, 1966      A. G. TUCCI      3,262,409

FABRIC-SHAPING DEVICES

Filed June 25, 1962      8 Sheets-Sheet 3

INVENTOR
Anthony G. Tucci

BY

ATTORNEY

July 26, 1966  A. G. TUCCI  3,262,409
FABRIC-SHAPING DEVICES
Filed June 25, 1962  8 Sheets-Sheet 5
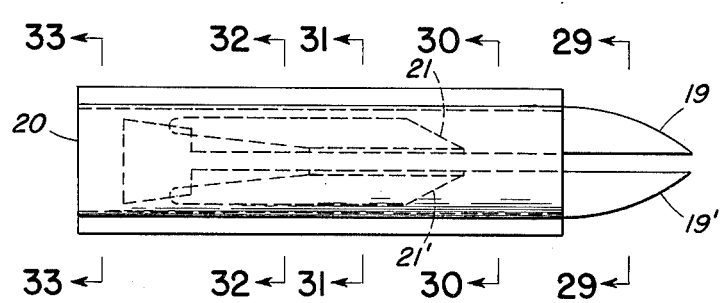
Fig. 27.
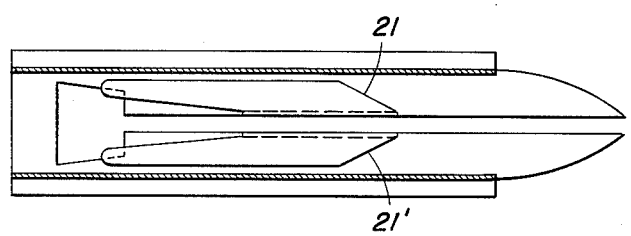
Fig. 28.
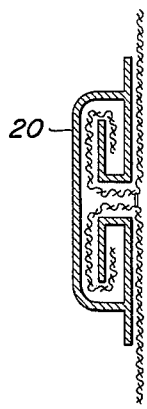
Fig. 31.
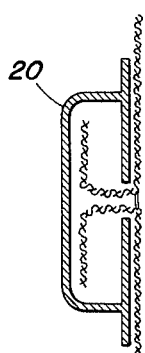
Fig. 30.
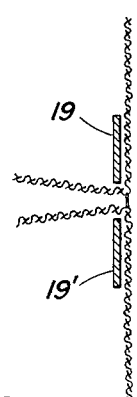
Fig. 29.
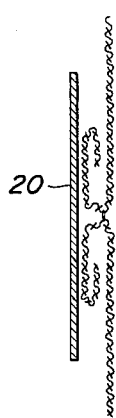
Fig. 33.
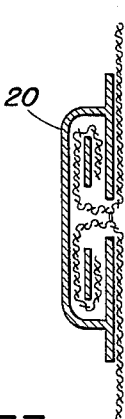
Fig. 32.
INVENTOR
Anthony G. Tucci
BY 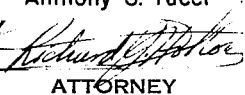
ATTORNEY July 26, 1966    A. G. TUCCI    3,262,409
FABRIC-SHAPING DEVICES
Filed June 25, 1962    8 Sheets-Sheet 6
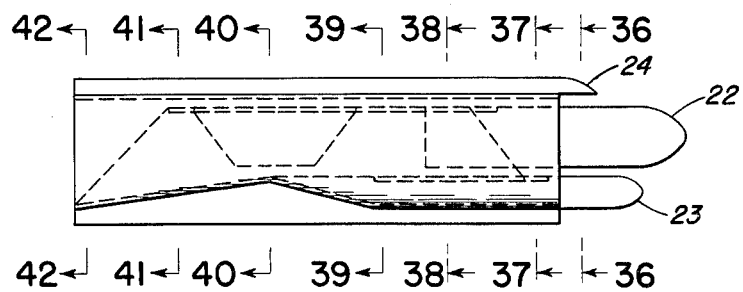
Fig. 34.
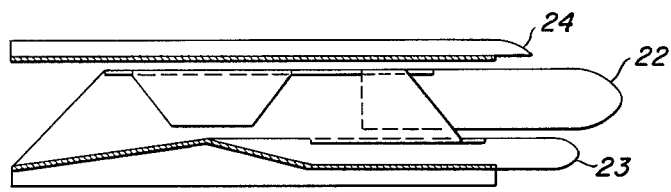
Fig. 35.
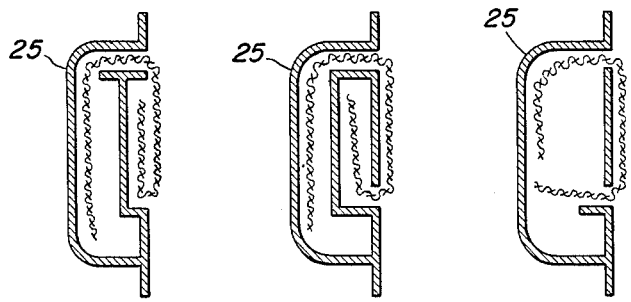
Fig. 39.    Fig. 38.    Fig. 37.
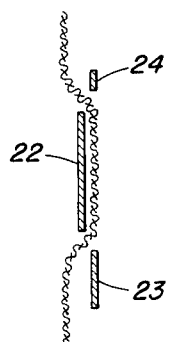
Fig. 36.
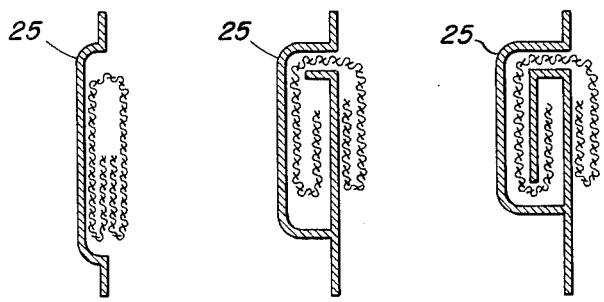
Fig. 42.    Fig. 41.    Fig. 40.
INVENTOR
Anthony G. Tucci
BY
ATTORNEY July 26, 1966  A. G. TUCCI  3,262,409
FABRIC-SHAPING DEVICES
Filed June 25, 1962  8 Sheets-Sheet 7

INVENTOR
Anthony G. Tucci
BY
ATTORNEY

July 26, 1966  A. G. TUCCI  3,262,409
FABRIC-SHAPING DEVICES
Filed June 25, 1962  8 Sheets-Sheet 8

INVENTOR
Anthony G. Tucci
BY
ATTORNEY

United States Patent Office 3,262,409
Patented July 26, 1966

3,262,409
FABRIC-SHAPING DEVICES
Anthony G. Tucci, 9602 103rd Ave., Ozone Park, N.Y.
Filed June 25, 1962, Ser. No. 204,985
5 Claims. (Cl. 112—147)

This invention relates to devices for manipulating and shaping cloth or the like. In particular, this invention relates to devices for use in conjunction with a presser or the like, for the purpose of presenting the material to the presser in a desired configuration, which configuration can be fixed in the fabric by the pressing operation.

Many devices and methods have been proposed for imparting desired predetermined configurations, such as folds, pleats, and the like, to cloth workpieces. In general, such devices have been designed as attachments for sewing machines, and their operation was such that the material was drawn through them just prior to being fed to the sewing machine, which, by means of stitching, rendered permanent or semi-permanent the configuration imparted to the material by the feed attachment. Thus, for example, there have been proposed hemming attachments. One such attachment was in the form of a tapered, horizontal, funnel-like device which, in cross-section, had the configuration of a spiral, instead of the circular cross-section of a true funnel. In operation, the edge of the material was pulled through the device from the large toward the small end, with the main portion of the fabric extending transversely out the open side of the spiral. As the material was drawn through this device, the tapered spiral form of the tool caused the edge of the material to be lifted up and turned back upon itself, and, on emerging from the attachment in such turned-back configuration, was immediately stitched down by the sewing machine to form a permanent hem. Other devices have been proposed for forming pleats in a piece of material as it was fed to a sewing machine, to the end that the pleats would be immediately stitched down and thus made permanent, and for accomplishing other similar operations, all with the general object of imparting a desired configuration to a piece of material and then rendering the configuration permanent or at least semi-permanent. All of these devices suffered from various disadvantages, but common to all of them was the disadvantage that such devices were not self-priming—that is to say they required that the operation be started by manually threading the material through the device. Particularly when the workpiece being operated on is a small item, such manual threading of each successive piece takes a major portion of the operator's time, and completely offsets the gains in efficiency which would otherwise be achieved by the use of the device. When a series of similar workpieces is being operated on, it is sometimes possible to achieve a semblance of continuity by allowing the starting end of each piece to overlap the end of the piece preceding it, and be drawn through the device thereby. This method, however, is wasteful of material, because the overlapping areas must be cut off and discarded, and the waste is proportionately greater when the work pieces being treated are small ones. Moreover, there are many operations which involve the folding of the material and subsequent fixing of the fold by stitching or otherwise, for which no satisfactory device has to date been offered, and which in consequence are still done by completely manual methods. Among these may be mentioned the production of a single fold, such as is used inside the pocket of a man's suit and in some hems, as well as the application of skirt bands to skirts, the manufacture of decorative artificial belts, and others.

It is an object of this invention, therefore, to provide improved apparatus for imparting a desired configuration to a piece of cloth or the like. Another object is to provide apparatus for such purpose, which is self-priming. Another object is to provide apparatus for carrying out folding operations heretofore performed by hand. Other objects and advantages will become apparent from the following more complete description and claims.

Broadly, this invention contemplates a device for imparting a folded configuration to a piece of flexible material, which comprises in combination foot means for holding a portion of a piece of fabric in contact with a subjacent surface, slot means for permitting an adjacent marginal portion of said fabric to extend vertically away from said surface, and shaping means for urging said marginal portion to a position in which it is doubled back over said first-named portion.

In a very simple embodiment, the device of this invention is an edge-turning device, suitable for turning one edge of a piece of fabric back upon itself for a short distance, say for example a half-inch after which the turned-back edge may be stitched or felled to fix it in that position. Such a construction is used in the clothing industry, for example, on the inside margin of the pocket of a man's suit jacket, and is customarily achieved manually by the sewing machine operator, who turns the material back with his fingers as he feeds the work to the machine. This method depends entirely on the skill and dexterity of the operator for its effectiveness, and in the hands of an unskilled operator, results in uneven widths of turned-back material and a poor product. Using the device of the present invention, the width of the turned-back edge is automatically maintained at a constant value, without effort on the operator's part, and an unskilled operator is able to produce an edge of a quality which could heretofore be produced only by a highly-skilled man.

Referring now to the figures, FIG. 1 is a plan view of the edge-turning device of this invention.

FIG. 27 is a plan view of another embodiment of the invention, which is adapted to put a double fold (similar to the hem fold produced by the device of FIG. 20) in each of the two narrow pieces of fabric adjacent to a stitched seam.

FIG. 28 is a plan view of the device of FIG. 27, but with certain parts omitted.

FIGS. 29–33 are a series of cross-sections of the device of FIG. 27, taken along lines 29—29, etc., of FIG. 27.

FIG. 34 is a plan view of another embodiment of the invention, which is adapted to convert a narrow piece of fabric to a strip which is folded longitudinally down the center, and has each of its ends turned in so as to be inside the fold, for use as a hemband, skirt-band or the like.

FIG. 35 is another plan view of the device of FIG. 34, with certain parts omitted.

FIGS. 36–42 are a series of cross-sections taken along lines 36—36, etc., of FIG. 34.

FIG. 43 is a plan view of an embodiment of the invention adapted to fold a "peg-leg" seam into the proper configuration to prepare it for a second sewing operation, as practiced in the making of a conventional robe seam, such as is used in bathrobes and the like.

Figure 54:
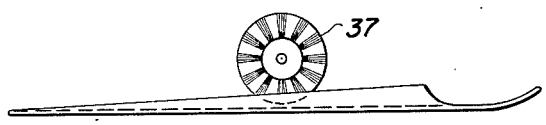
FIG. 54 is a side elevation of a device according to this invention, provided with a coaxing wheel to assist the transport of fabric through the device.

In the various plan views of the various embodiments of the invention, i.e. FIGS. 1, 2, 8, 9, 14, 15, 20, 21 27, 28, 34, 35, 43 and 50, and also in FIG. 54, the fabric is not shown, for the sake of clarity in showing the structures of the devices themselves. In all of the cross-sectional views, the fabric is shown, to illustrate the manner in which it takes on the desired configuration while passing through the device.

Referring back to the edge-turner as shown in FIGS. 1–7, it can be seen that the front end of the device (that is to say the end which first comes in contact with the fabric) comprises a pair of guides 1 and 2. Guide 1 is preferably turned slightly upward at its forward end, to facilitate passage of the fabric between it and the subjacent surface.

To facilitate understanding of the devices according to this invention, it should be explained at this point that the device is movable relative to the subjacent surface. The devices of this invention may be employed in connection with a flatiron or the like (as attachments on the iron), in which case the iron and the attachment move, while the fabric and the subjacent surface are stationary. Alternatively, and preferably, these devices may be used as attachments on a belt-driven pressing iron, for example a seam-presser, such as is described in my copending application Serial No. 97,681, filed March 22, 1961, now U.S. Patent No. 3,107,447. In such a device, a workpiece is transported by a belt to a point where it is steamed, and then to an area where it is pressed and dried while traveling with said belt in contact with a drying iron. When the edge-turner of this invention is mounted over said belt and in line with and in front of the steaming means, the belt 38 (FIG. 55), which in this arrangement is the subjacent surface, engages the workpiece, draws it through the edge-turner, and then immediately under the steaming means and thence under the drying iron, so that the fold imparted by the edge-turner is immediately fixed in the fabric by the pressing operation.

Figure 55:
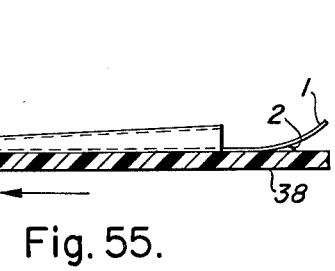
FIG. 55 is a side elevation of a device according to the embodiment of FIG. 1, showing the operative position of a relatively moving subjacent surface, which in this preferred embodiment is a portion of a belt.
Figure 8:
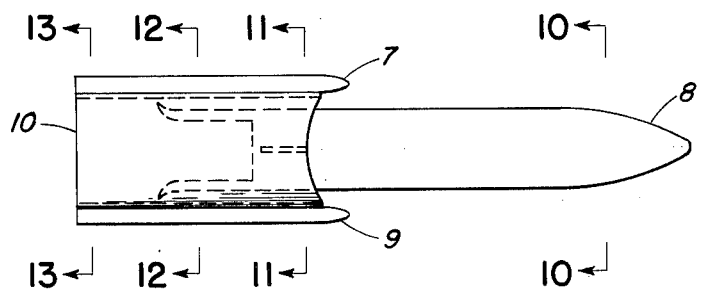
FIG. 8 is a plan view similar to FIG. 1, showing another embodiment of the invention, adapted for turning back both edges of a narrow piece of fabric, for example in the manufacture of decorative false belts.
Figure 9:
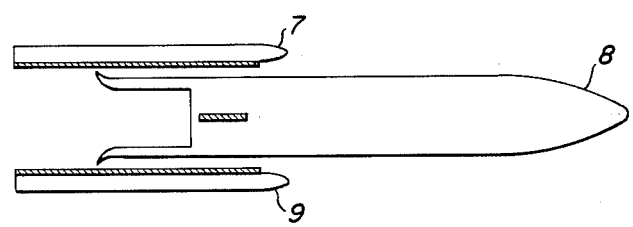
FIG. 9 is a plan view of the device of FIG. 8, with certain parts omitted.
Figure 11:
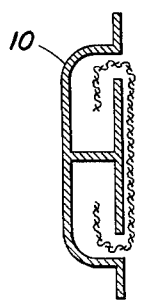
FIGS. 10–13 are a series of cross-sections of the device of FIG. 8, taken at various points as indicated by lines 10—10, etc., of FIG. 8.
Figure 10:
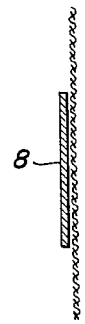

As shown in FIGS. 1–7, the workpiece enters the edge-turner through the slot defined by the opposed edges of guides 1 and 2, by passing under guide 1, which is turned slightly upward, and over guide 2, which lies flat against the subjacent surface, as best shown in FIG. 55. As the workpiece 3 passes from right to left (FIG. 1), the free edge 4 of the fabric is intercepted by shroud 5. Shroud 5 is omitted in FIG. 2, for clarity in showing the internal parts fo the edge-turner. The action of shroud 5 is to force the marginal portion of the workpiece up into the curved configuration shown in FIG. 4.

Figure 1:
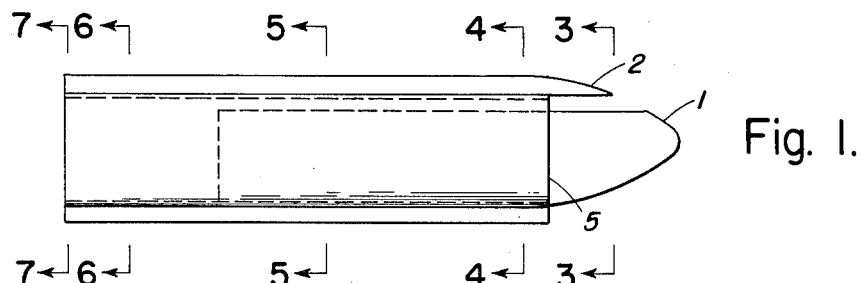
Figure 2:
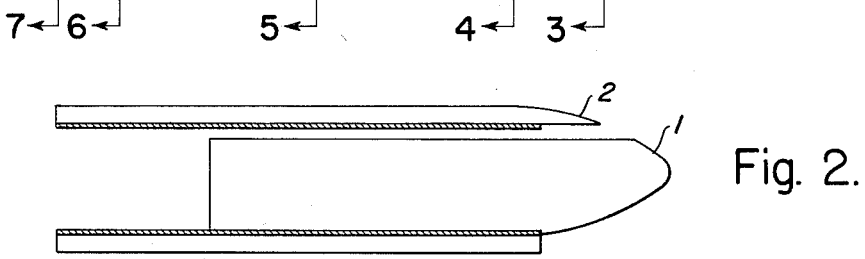
FIG. 2 is a plan view similar to FIG. 1, but omitting certain parts in order to show others more clearly.
Figure 3:
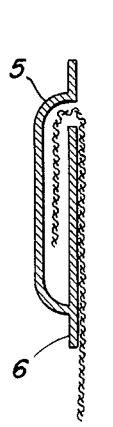
FIGS. 3–7 are a series of cross-sections of the device shown in FIG. 1, taken along the lines 3—3, etc., of FIG. 1.
Figure 4:
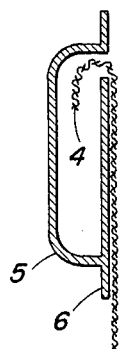
Figure 5:
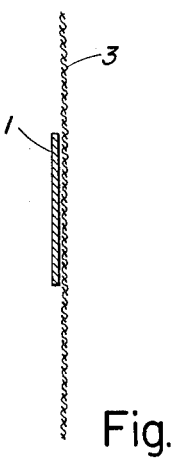
Figure 7:
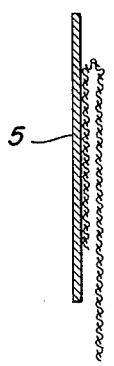
Figure 6:
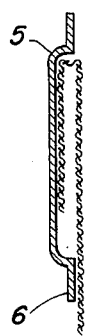

As the workpiece continues to pass through the edge-turner, guide 1 lies within the curve produced in the workpiece by the action of shroud 5, as shown in FIG. 5. Proceeding farther through the edge-turner, shroud 5 diminishes in height, forcing the folded over margin of the workpiece to lie flat against the main body of the fabric, while guide 1 recedes and withdraws from between the two layers of fabric, allowing them to lie flat against each other. Successive stages in this process are shown in FIGS. 6 and 7. Throughout the operation, the workpiece is drawn continuously through the edge-turner by frictional engagement with the subjacent surface, being constantly urged into engagement therewith by the downward pressure of foot 6, which in this embodiment is integral with and merges into guide 1.

The relative positions of the edge-turner and belt 38 are shown in FIGURE 55, which is equally representative of the relative positions of the fabric-shaper and the subjacent surface in all embodiments of the invention.

Figure 13:
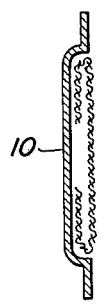
Figure 12:
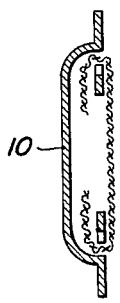
Figure 14:
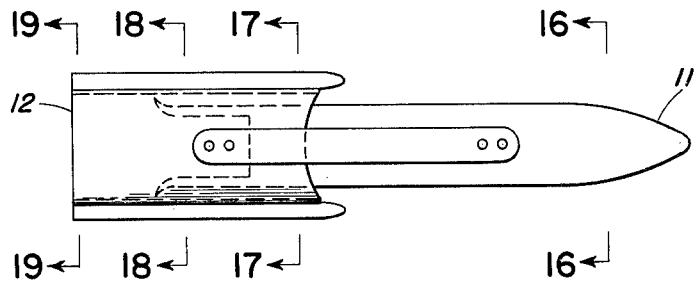
FIG. 14 is a plan view of an alternative embodiment of this invention, used for the same purposes as the device of FIG. 8.
Figure 15:
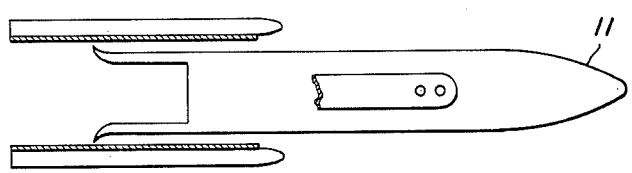
FIG. 15 is a plan view of the device of FIG. 14, with certain parts omitted.
Figure 17:
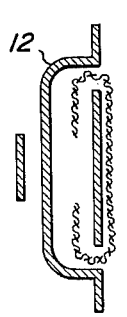
FIGS. 16–19 are a series of cross-sections along lines 16—16, etc., of FIG. 14.
Figure 16:
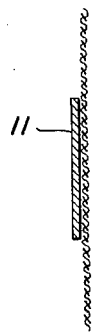
Figure 19:
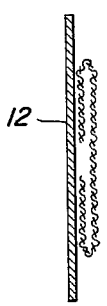
Figure 18:
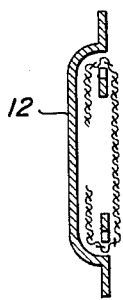
Figure 20:
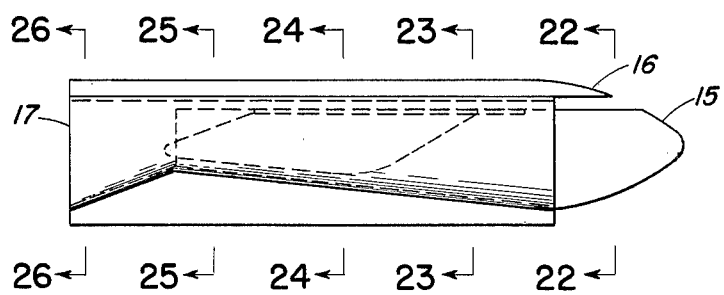
FIG. 20 is a plan view of another embodiment of the invention, adapted to put two folds, both in the same direction, in a piece of material, for example in making a hem.
Figure 21:
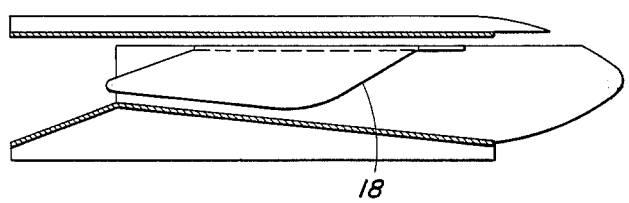
FIG. 21 is a plan view of the device of FIG. 20, with certain parts omitted.
Figure 24:
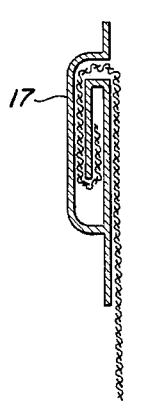
FIGS. 22–26 are a series of cross-sections taken along lines 22—22, etc., of FIG. 20.
Figure 23:
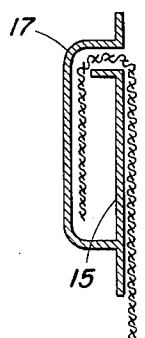
Figure 22:
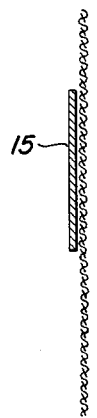

FIGS. 8–13 illustrate a belt-maker, which is an embodiment of the invention adapted to turn both edges of a relatively narrow piece of fabric, for the manufacture of decorative false belts to be sewn on garments, or as one stage in the manufacture of actual belts—for example self-belts for use with ladies' dresses. In the belt-maker of FIGS. 8–13, the workpiece is fed longitudinally into the device through the slots formed respectively between guide 7 and foot 8, and between foot 8 and guide 9. Foot 8 is preferably turned slightly upward at its forward end, to facilitate feeding the workpiece under it, while guides 7 and 9 lie closely against the subjacent surface. As the workpiece passes through the belt-maker from right to left, being held against the subjacent surface by foot 8, its edges are turned over by the action of shroud 10, and flattened down as shroud 10 tapers down to a flat channel as shown in FIG. 13. Shroud 10 is omitted in FIG. 9 in order to show the internal construction more clearly.

Another type of belt-maker is shown in FIGS. 14–19. This embodiment differs from that of FIGS. 8–13 in that the foot 11 is connected to shroud 12 by means of an external strap, instead of by an internal vertical member. The operation of the belt-maker of FIGS. 14–20 is similar to that of FIGS. 8–13.

Figure 26:
Figure 25:
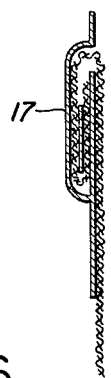
Figure 43:
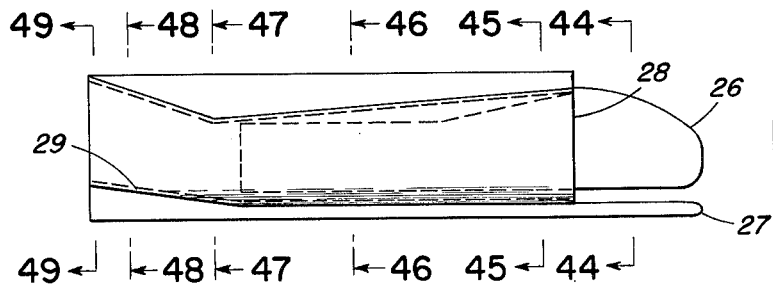

FIGS. 20–26 illustrate another embodiment of the present invention, in this case a hemmer. The function of the hemmer is to put two folds, both in the same direction, in the edge of a piece of fabric, so that when the double fold is stitched or felled down, the inside of the hem will have a neat, finished appearance. In the operation of the hemmer, the fabric enters through the slot defined by the opposing edges of foot 15 and guide 16. As the fabric proceeds through the hemmer from right to left, it is turned over by shroud 17. Foot 15 is extended inwardly and upward, and supports plate 18. In the region shown in cross-section by FIGS. 24 and 25, shroud 17 and plate 18 define between them a narrow channel which forces the workpiece to assume the doubly-folded configuration shown. In FIG. 26, the piece is shown as it is about to emerge from the hemmer, ready for pressing (in lieu of basting) or for immediate feed to the sewing machine to produce a finished hem.

FIGS. 27–33 illustrate another embodiment of the invention, in this case a seam-dresser. The purpose of the seam-dresser is to finish a seam, as viewed from inside the garment, so as to provide a neat, well-made appearance. Normally, it is necessary for the operator to sew the seam, to the best of his ability, in such a way that the two narrow strips of fabric are of equal and uniform width. If the operator is unskillful, the two strips will not be of equal and uniform width throughout, and the seam will not have a well-made, attractive appearance. Moreover, if there have been errors in cutting, it may be impossible to make the widths of the two strips equal and uniform throughout their lengths, regardless of the skill of the operator. The seam-dresser of FIGS. 27–33 overcomes these problems by automatically measuring a predetermined width of material in each direction perpendicular to the seam, and then turning the remainder under, producing, in effect, on each side of the stitching a double fold similar to the double fold produced by the hemmer of FIGS. 20–26.

In the operation of the seam-dresser, the seamed workpiece is fed into the device in such a manner that the line of stitching passes longitudinally into the slot defined by the opposing edges of feet 19 and 19', with the narrow strips of fabric adjacent the seam extending upwardly through the slot, while the main portions of the pieces which have been sewn together extend horizontally in opposite directions under the two feet. Fixed operating means in the form of a plough or the like (not shown) may, if desired, be provided for the purpose of opening the seam—that is, of separating the two narrow strips of fabric extending up through the slot. Ordinarily, however, it is simpler and more desirable for the operator to separate the two strips manually, to a sufficient extent so that, when intercepted by shroud 20, they will be forced in opposite directions, instead of both going to the right or to the left. Feet 19 and 19' are extended upwardly and then outwardly, forming fingers 21 and 21'. Fingers 21 and 21', together with shroud 20 and the upper surfaces of feet 19 and 19', form a pair of narrow channels, forcing the two strips of fabric to assume the configuration shown in FIG. 32. As shroud 20 assumes the configuration of a flat tube, fingers 21 and 21' terminate, and feet 19 and 19' recede, leaving the dressed seam ready for pressing, as shown in FIG. 33.

FIGS. 34–42 illustrate still another embodiment of the invention, this embodiment being a skirt-band maker or the like. In the operation of this embodiment of the invention, a strip of fabric of appropriate width is fed longitudinally into the skirt-band maker under foot 22, with the marginal portions extending upwardly through the slots defined by the opposing edges of foot 22 and guides 23 and 24, respectively. As the workpiece progresses through the skirt-band maker, guide 23 is extended upwardly as shown in FIG. 37, and then inwardly. Simultaneously, the right-hand side of foot 22 is extended upwardly to meet the inward extension of guide 23, producing the configuration shown in FIG. 38. Foot 22 then terminates except for its upward extension, while the inward extension of guide 23 decreases in elevation, taking over the function of foot in holding the workpiece against the subjacent surface, as shown in FIG. 39. The upward extension of foot 22 is then projected outwardly (to the left as seen in FIG. 39), while the inward extension of guide 23 descends further, assuming the configuration shown in FIG. 40, and producing a second fold in the workpiece. Then the upward extension of foot 22 recedes (FIG. 41), followed by the inward extension of guide 23. Throughout the process, shroud 25 has been decreasing in height, until it assumes the shape of a flattened tube, as indicated in FIG. 42, and the workpiece emerges therefrom in the desired configuration, i.e. a channel having both edges turned inwardly, into which the upper margin of a skirt body may be inserted.

Figures 44, 45, 46:
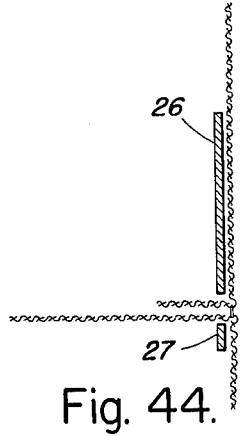
FIGS. 44–49 are a series of cross-sections taken along lines 44—44, etc., of FIG. 43.
Figures 47, 48, 49:
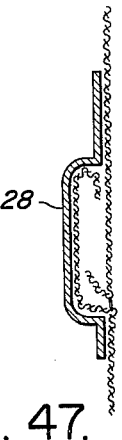
Figure 50:
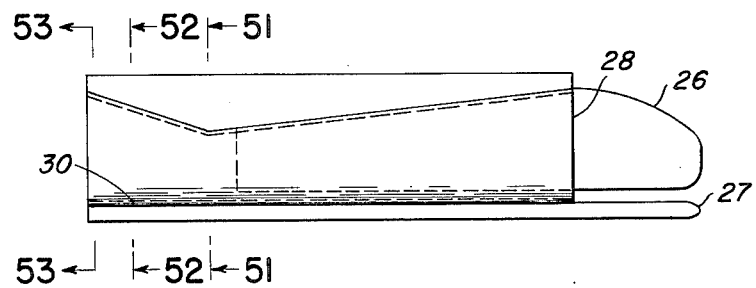
FIG. 50 is a plan view of an embodiment similar to that of FIG. 43, but modified to produce a novel type of seam.

The embodiment of the present invention shown in FIGS. 43–49 is adapted to produce a seam of the type customarily used in bathrobes and the like. The workpiece is initially sewn in the form of a "peg-leg" seam—i.e. a seam having a narrow strip of fabric on one side of the seam and a comparatively wide strip on the other. The seamed workpiece is then fed into the device of FIG. 43 in the manner shown cross-sectionally in FIG. 44, both of the aforesaid strips projecting upwardly through the slot defined by the opposed edges of foot 26 and guide 27, while the main portions of the workpiece, which will become the body of the garment, lie under foot 26 and guide 27, extending away horizontally in either direction. As the workpiece proceeds through the device, the wider strip is folded over the narrower one by the action of shroud 28, as shown in FIG. 45, and then doubled under itself, as shown in FIGS. 46 and 47. Foot 26 terminates, and its function of holding the workpiece against the subjacent surface is thenceforward fulfilled by the side members, one of which is integral with guide 27 while the other is a similar portion on the opposite side of the device. The left-hand sidewall of shroud 28 terminates in a portion which is directed inwardly toward the center of the device, as indicated at 29. The function of this portion is to urge the top layer of fabric toward the right, so as to produce a conventional robe seam, as shown in FIG. 49. When the side wall of the shroud is not thus directed inwardly, a different type of seam is produced, as will presently appear.

Like the other embodiments of the present invention, the robe-seam maker of FIGS. 43–49 may be used to feed the workpiece directly to a sewing machine—in this case, a two-needle machine which sews the seam down with two parallel lines of stitching, one near each side of the seam as it is shown in FIG. 49. It is preferred, however, to discharge the device into a pressing iron. When this is done, the configuration shown in FIG. 49 is fixed in the fabric with sufficient permanence to allow the two lines of stitching to be put in separately and successively, using a single-needle sewing machine. While this method entails a double sewing operation, and would not be chosen for inexpensive work, it produces a better garment because it avoids the ripple effect produced when a seam of this type is sewn down with a two-needle machine.

Figures 51, 52, 53:
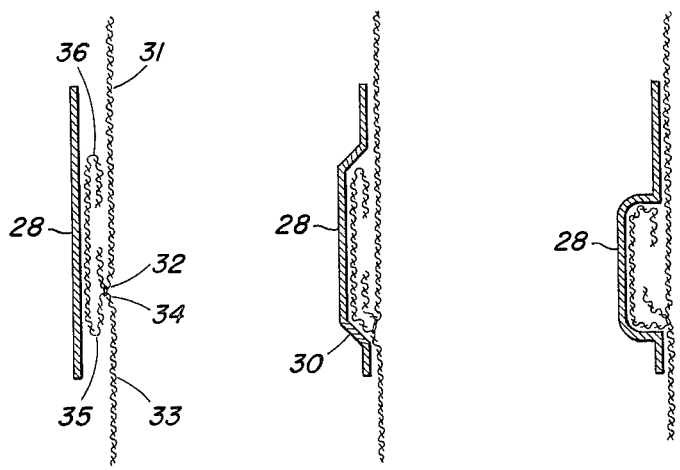
FIGS. 51–53 are a series of cross-sections taken along lines 51—51, etc., of FIG. 50.

A modification of the device of FIGS. 43–49 is illustrated in FIGS. 50–53. The device and the operation thereof are similar to those of the device of FIGS. 43–49, except that the side wall of the shroud is carried straight back as indicated at 30, instead of being directed inwardly toward the center of the device. When the device is constructed in this manner, the upper layer of fabric of the seam, when pressed down by the top of the shroud, extends itself partly to the left, producing the configuration shown in FIG. 53. When the seam as illustrated in FIG. 53 is stitched, or preferably blind-felled, to fix the two edges of the seam to the main body of the fabric, a seam of unusually handsome appearance and flatness is produced. Garments made with this type of seam throughout may in fact be made reversible even though unlined, in sharp distinction from the usual type of reversible garment which is, in effect, simply two garments assembled together in such fashion that each is a liner for the other, and each conceals the seams of the other.

This seam, which is novel in itself, may be described as being composed of a first portion of fabric extending to a first fold line, said first portion being folded upwardly and doubled back along said first fold line and extending for an appreciable distance back from said fold line to an edge, and a second portion of fabric extending to a second fold line, said second portion being folded upwardly and doubled back along said second fold line and extending for an appreciable distance back from said second fold line to a third fold line, said second portion of fabric further being folded upwardly and doubled forward along said third fold line for an appreciable distance to a forth fold line, said second portion of fabric further being folded downwardly and doubled back along said fourth fold line for an appreciable distance to an edge, said first fold line of said first portion of fabric being contiguous with said second fold line of said second portion of fabric and united thereto, said second portion of fabric being united to itself along said third fold line and to said first portion of fabric along said fourth fold line.

In the seam as illustrated in FIG. 53, the first portion of fabric is designated as 31, the first fold line as 32, the second portion of fabric as 33, the second fold line as 34, the third fold line as 35, and the fourth fold line as 36. The stitching required to make the seam of FIG. 53 permanent is not fully indicated in the figure; one line of stitching connects first fold line 32 with second fold line 34, a second connects third fold line 35 with the underlying part of second fabric portion 33, and a third connects fourth fold line 36 with the underlying part of first fabric portion 31. In describing the location of the stitching as connecting a particular fold line with another portion of fabric, it is of course to be understood that the line of stitching need not be precisely on the fold line, as long as the stitching is such as to hold the fold line in close proximity with the designated fabric portion.

FIG. 54 illustrates a device according to the present invention, equipped with a coaxial wheel. Ordinarily, this expedient is superfluous, but it occasionally happens that because of friction, the upper layer of a folded workpiece will lag slightly behind the lower portion (which is the portion being driven through the machine by the relative motion of the subjacent surface). In such cases, it is sometimes advantageous to provide an auxiliary drive, which is represented in FIG. 54 as a rotary brush 37 extending through a slot in the upper portion of the shroud. The brush may be driven in any convenient manner, for example by a flexible cable (not shown) taking its power from the power source which provides relative motion between the device of the invention and the subjacent surface. The use of such a flexible cable drive for a similar purpose is shown, for example, in U.S. Patent No. 3,083,658 of R. W. Winberg. The peripheral speed of the brush should approximate or slightly exceed the linear speed of the workpiece through the device. For best results, the brush should contact the workpiece as near to the edge, and as far from the fold line where the workpiece extends upwardly through the slot, as possible. In place of a brush, a gear or the like may be employed. Such a coaxing wheel may be employed in connection with any of the various embodiments of the invention herein described, if needed or desired to assist the passage of the workpiece through the fabric-shaping device.

Comparing the manner in which the various folding operations are automatically and rapidly performed by the several embodiments of the invention just described, with the ways in which similar operations have been carried out in conventional practice, the advantages of this invention become immediately apparent. To usual manual folding of an edge, as compared with the production of such a fold by the edge-turner shown in FIGS. 1–7, has already been alluded to.

The preparation of a false belt or the like, i.e. a strip of matreial having a longitudinal fold along each edge, is normally done by the sewing-machine operator manually folding each of the two edges separately as he feeds it to the sewing machine. The sewn piece is then pressed in a separate operation. This method is slow and inaccurate, and the uniformity of belt width and width of the turned edges is entirely dependent on the skill of the operator. Using the belt-maker of FIGS. 8–13, on the other hand, once the material is started into the device, the width of the belt is automatically fixed, and the width of the turned edges depends only on the operator feeding the material straight into the device. Moreover, in the preferred method of using the devices of this invention—that is with the shaping device discharging directly into the feed end of a belt-driven pressing machine, the pressing operation takes place automatically, without further attention on the part of the operator. Since the pressing operation fixes the edge-folds in the fabric, no sewing operation is required, other than that involved in sewing the belt to the garment (which is normally a separate, second sewing operation). The same remarks apply equally to the belt-maker shown in FIGS. 14–19.

In folding a hem, there are in use a number of conventional methods. When it is permissable to sew through the garment, the hem can be folded over manually by the sewing-machine operator, or he may use a hemmer attachment to assist him in making the hem fold. In either event, after the hem fold is made, the operator sews through the double fold. Both of these methods tend to result in distortion of the hem, because the operator is not able manually to make a perfectly even hem, while the conventional hemmer attachment tends to drag the folded portion of the material behind the main body of material being advanced by the feed mechanism in the table.

When it is not permissable to sew through the garment, it is necessary to baste the hem and subsequently fell it, either by machine or by hand, and then to remove the basting. This method also is subject to the same difficulties entailed by the method just described. In addition, it involves a basting operation and an additional opeartion to remove the basting.

Using the hemmer according to the present invention, however, as illustrated in FIGS. 20–26, it is not necessary that the operator form the hem manually, nor yet that he employ the conventional, non-self-priming type of hemmer attachment. The operator need merely pass the workpiece into the feed end of the hemmer, whereupon it is automatically carried through and automatically formed into a completely uniform, well-made hem configuration. Moreover, using the preferred mode of opeartion where the hemmer discharges directly into a presser, it is not necessary either to sew through the garment or to baste, then fell, and subsequently remove the basting. Instead, the iron fixes the hem made by the hemmer, so that it is then necessary only to fell the edge in order to finish the hem.

In making a robe seam by conventional methods, a number of methods are used. In one method which is commonly employed, the whole seam is fashioned manually by the operator as he feeds the work to a two-needle machine. This method is rapid and inexpensive but undesirable due to the bulkiness of the resulting seam. Also, the fact that the two needles are on the same bar causes a wavy or rippled effect in the seam, such as is frequently noted in a man's shirt seam. Other methods are in use, which employ conventional sewing machines, but require repeated manual folding and critical judgment on the part of the operator—to the extent that it is customary to use a gauge in some operations, rather than trust the operator's eye.

Using the robe-seam maker as shown in FIGS. 43–49, these difficulties are avoided, and a neat, uniform and non-bulky robe seam is produced automatically, without any effort on the part of the operator other than to feed the workpiece into the device. The robe-seam maker may be arranged to discharge directly to a sewing machine or to a presser, but in either event, a single line of stitching or a conventional machine suffices to complete the seam, and the quality of the seam does not particularly depend on critical judgment of the operator as to the position of the stitching.

In dressing a seam, a number of methods are used, depending on production requirements and/or the price range of the garment. In a typical operation, the edges of the two pieces of fabric are turned, basted, and felled. The felled edges are then pressed, after which the seam is sewn, and then the seam is pressed open.

Using the seam-dresser according to this invention, as shown in FIGS. 27–33, it is necessary only to sew the seam and run it through the seam-dresser, preferably discharging into a presser. If desired, the edges may be felled later, but the basting and preliminary pressing operations are eliminated altogether. Alternatively, the effect of felling may be achieved by gluing the edges down, for example by the use of a heat-sensitive adhesive which is activated by the pressing operation.

In conventional methods for making skirt bands, the operation may be carried out using one, two, or three stitches. In each case, the sewing machine operator does the folding by hand. Leaving the folding to the sewing machine operator frequently results in an uneven skirt band.

Using the skirt band maker illustrated in FIGS. 34–42, however, the folding is accomplished automatically and uniformly, and the folded product may be discharged either directly to the sewing machine or to a presser which fixes the folds, so that they may later be rendered permanent by stitching.

While this invention has been described in terms of certain preferred embodiments and illustrated by way of certain drawings, these are illustrative only, and the invention is not to be construed as limited, except as set forth in the appended claims.

I claim:

1. A device for folding two opposed parallel edges of a strip of flexible material, said device being adapted to be mounted above and immediately adjacent a relatively movable subjacent surface, which comprises in combination foot means for holding a medial portion of said strip in frictional engagement with said relatively movable subjacent surface, said foot means having a leading edge adapted to be mounted in spaced relation to said subjacent surface, guide means cooperating with opposed edges of said foot means to define a pair of slots open at both ends, whereby a marginal portion of said strip may extend upwardly away from said relatively movable subjacent surface through each of said slots, said guide means having leading edges adapted to be mounted in contact with said relatively movable subjacent surface to turn said marginal portions of said workpiece upwardly into said slots, and shroud means overlying said slots for urging said marginal portions downwardly to overlie said medial portion, said strip of material being drawn through said device by relative movement between said device and said subjacent surface in a direction generally parallel with said slots.

2. A device for imparting to a strip of flexible material a folded configuration of the type employed for a skirt band, said device being adapted to be mounted above and immediately adjacent a relatively movable subjacent surface, comprising in combination foot means for holding a medial portion of said strip in frictional engagement with said relatively movable subjacent surface, said foot means having a leading edge portion thereon adapted to be mounted in spaced relation to said relatively movable subjacent surface, guide means cooperating with opposite edges of said foot means to define a pair of slots, open at both ends, whereby a marginal portion of said strip may extend upwardly through each of said slots, said guide means having leading edges adapted to be mounted in contact with said relatively movable subjacent surface to turn said marginal portions of said workpiece upwardly into said slots, shroud means overlying one of said slots for urging a first of said marginal portions to a position overlying said medial portion, shroud means overlying the other of said slots for urging the second of said marginal portions to a position overlying said medial portion and said first marginal portion, and flange means for tucking the edge of said second marginal portion between said first marginal portion and the remainder of said second marginal portion, said strip of material being drawn through said device by relative movement between said device and said subjacent surface in a direction generally parallel with said slots.

3. A device for imparting a folded configuration to a piece of flexible material, said device being adapted to be mounted above and immediately adjacent a relatively movable subjacent surface, which comprises in combination foot means for holding a portion of said piece in frictional engagement with said relatively movable subjacent surface, said foot means having thereon a leading end portion adapted to be mounted in spaced relation to said relatively movable subjacent surface, guide means cooperating with said foot means to form a slot, said guide means having a leading end portion adapted to be mounted in contact with said relatively movable subjacent surface to turn a portion of said workpiece upwardly into said slot, shaping means for urging said marginal portion to a position in which it is doubled back over said first-named portion, and coaxing means for assisting the passage of said marginal portion through said device, said piece being drawn through said device by relative movement between said device and said subjacent surface in a direction generally parallel with said slot, assisted by the action of said coaxing means on said marginal portion.

4. A device for folding a piece of flexible material, said device being adapted to be mounted above and immediately adjacent a relatively movable subjacent surface, which comprises in combination a first guide member, a second guide member, said first guide member and said second guide member defining between them a slot open at both ends, one of said guide members serving as a foot and having thereon a leading end portion adapted to be mounted in spaced relation to said relatively movable subjacent surface, said foot acting to hold a portion of said workpiece in frictional engagement with said relatively movable subjacent surface at least in the region underlying that portion of said foot member which cooperates with said guide member to form said slot, the other guide member having a leading edge adapted to be mounted in position to enter under a leading edge of a workpiece carried on said relatively movable subjacent surface to turn a portion of said workpiece upwardly into said slot, said guide member being adapted to be mounted in close proximity to a subjacent surface and thereby prevent lateral escape of material from said slot under said guide member, and shroud means overlying said slot for urging a portion of said workpiece which extends upwardly through said slot to a position in which it overlies the portion of said workpiece which is under said foot, said workpiece being drawn through said device by relative movement between said device and said subjacent surface in a direction generally parallel with said slot.

5. A device for imparting a hem-fold to a workpiece of flexible material, said device being adapted to be mounted above and immediately adjacent a relatively movable subject surface, which comprises in combination foot means having a folding edge for holding a portion of said workpiece in frictional engagement with said relatively movable subjacent surface at least in the region underlying said folding edge, said foot means having a leading edge portion thereon adapted to be mounted in spaced relation to said relatively movable subjacent surface, guide means cooperating with said foot means to define a slot, open at both ends, through which a marginal portion of said workpiece may extend upwardly away from said relatively movable subjacent surface, said guide means having a leading edge adapted to be mounted in position to enter under a leading edge of a workpiece carried on said relatively movable subjacent surface to turn a marginal portion of said workpiece upwardly into said slot, said guide member being adapted to be mounted in close proximity to a subjacent surface and thereby prevent lateral escape of material from said slot under said guide member, shroud means overlying said slot for urging said upwardly-extending marginal portion downwardly to a position overlying said first-named portion, and flange means intermediate said shroud means and said foot means for urging the edge of said marginal portion to a position between the remainder of said marginal portion and said first-named portion of said workpiece, said workpiece being drawn through said device by relative movement between said device and said subjacent surface in a direction generally parallel with said slot.

References Cited by the Examiner

UNITED STATES PATENTS

| | | | |
|---|---|---|---|
| 142,689 | 9/1873 | Eldredge | 112—141 |
| 144,736 | 11/1873 | Bryant et al. | 112—141 |
| 153,301 | 7/1874 | Bean | 112—141 |
| 529,419 | 11/1894 | Schoen | 112—141 |
| 623,891 | 4/1899 | Diehl et al. | 112—143 |
| 983,388 | 2/1911 | McKane | 112—214 X |
| 1,489,217 | 4/1924 | Jones | 112—147 |
| 1,823,954 | 9/1931 | Sailer | 112—141 |
| 2,024,971 | 12/1935 | Le Roy | 2—275 |
| 2,515,321 | 7/1950 | Stanley | 2—275 |
| 2,518,340 | 8/1950 | Levine et al. | 112—141 |
| 2,776,636 | 1/1957 | Seserman | 112—147 |
| 2,867,183 | 1/1959 | Klasing | 112—10 |
| 2,972,317 | 2/1961 | Ashe | 112—147 |
| 3,083,658 | 2/1963 | Winberg | 112—214 |
| 3,192,885 | 7/1965 | Timm | 112—2 |

FRANK J. COHEN, *Primary Examiner.*

DAVID J. WILLIAMOWSKY, ROBERT V. SLOAN, JORDAN FRANKLIN, *Examiners.*

P. L. GARDNER, *Assistant Examiner.*